(12) United States Patent
Eissara et al.

(10) Patent No.: US 11,541,476 B2
(45) Date of Patent: Jan. 3, 2023

(54) METHOD AND DEVICE FOR JOINING ELEMENTS TO COMPONENTS

(71) Applicant: NEWFREY LLC, New Britain, CT (US)

(72) Inventors: Bah Eissara, Giessen (DE); Gerson Meschut, Paderborn (DE); Christian Reis, Giessen (DE)

(73) Assignee: NEWFREY LLC, New Britain, CT (US)

( * ) Notice: Subject to any disclaimer, the term of this patent is extended or adjusted under 35 U.S.C. 154(b) by 234 days.

(21) Appl. No.: 16/448,199

(22) Filed: Jun. 21, 2019

(65) Prior Publication Data

US 2019/0344374 A1 Nov. 14, 2019

Related U.S. Application Data

(63) Continuation of application No. PCT/EP2017/081272, filed on Dec. 1, 2017.

(30) Foreign Application Priority Data

Dec. 23, 2016 (DE) .......................... 102016125899.8
Jun. 28, 2017 (EP) ..................................... 17178341

(51) Int. Cl.
  *B23K 9/20* (2006.01)
  *B23K 10/00* (2006.01)
  *B23K 9/235* (2006.01)
(52) U.S. Cl.
  CPC ................ *B23K 9/20* (2013.01); *B23K 9/235* (2013.01)

(58) Field of Classification Search
  CPC ....... B23K 9/202; B23K 9/20; B23K 35/0288
  (Continued)

(56) References Cited

U.S. PATENT DOCUMENTS 3,835,284 A * 9/1974 Gstohl .................. B23K 9/202
  219/98
3,898,418 A * 8/1975 Hasui ..................... B23K 10/02
  219/121.45
(Continued)

FOREIGN PATENT DOCUMENTS

| EP | 2314407 A | 4/2011 |
| JP | S49-130344 A | 12/1974 |
| WO | 0069593 A | 11/2000 |

OTHER PUBLICATIONS

International Search Report and Written Opinion of the International Searching Authority dated Jan. 11, 2018.
(Continued)

*Primary Examiner* — Helena Kosanovic
*Assistant Examiner* — Lawrence H Samuels
(74) *Attorney, Agent, or Firm* — Michael P. Leary (57) ABSTRACT

A method for joining by welding or gluing joining elements to components, with the following steps: preparation of a joining element, which comprises a first joining surface, and preparation of a component, which comprises a second joining surface; preparation of the first or second joining surface; and carrying out the joining process, in which the joining element is joined to the component; wherein the preparatory step comprises at least one of the following cleaning methods for cleaning the first or second joining surface: a TIG arc method, a plasma gas cleaning method, and a snow jet method.

7 Claims, 4 Drawing Sheets

(58) Field of Classification Search
USPC .................................................... 219/98, 99
See application file for complete search history.

(56) References Cited

U.S. PATENT DOCUMENTS

| | | | | |
|---|---|---|---|---|
| 5,510,597 | A | * | 4/1996 | Kampmann ....... B23K 20/2336 219/121.64 |
| 5,587,093 | A | | 12/1996 | Aston |
| 5,662,820 | A | * | 9/1997 | Schwiete ............... B23K 9/202 219/98 |
| 9,283,635 | B2 | * | 3/2016 | Peters .................. B23K 9/1675 |
| 2003/0019847 | A1 | * | 1/2003 | Schmitt ................. B23K 9/205 219/99 |
| 2003/0189033 | A1 | * | 10/2003 | Aoyama ............... B23K 9/206 219/125.1 |
| 2005/0211685 | A1 | * | 9/2005 | Blankenship .......... B23K 9/173 219/130.4 |
| 2013/0228555 | A1 | * | 9/2013 | Peters .................. B23K 9/1735 219/74 |
| 2015/0266125 | A1 | * | 9/2015 | Enyedy .................... G05G 1/30 219/136 |
| 2015/0266269 | A1 | * | 9/2015 | Haack .................... B32B 15/01 428/223 |
| 2016/0064195 | A1 | | 3/2016 | Lin et al. |
| 2019/0099828 | A1 | * | 4/2019 | Iitsuka .................. B23K 9/007 |

OTHER PUBLICATIONS

European Office Action dated Aug. 3, 2020.
Office Action dated Jun. 28, 2021 cited in corresponding Japanese Application No. 2019-533494.
European Search Report dated Mar. 30, 2022 cited in corresponding European Application No. 21212552.0.

* cited by examiner

METHOD AND DEVICE FOR JOINING ELEMENTS TO COMPONENTS

CROSS-REFERENCE TO RELATED APPLICATIONS

This application is a continuation of international application PCT/EP2017/081272, filed Dec. 1, 2017 which claims priority from European Patent Application No. 17178341.8 filed Jun. 28, 2017 and German Patent Application No. 102016125599.8 filed Dec. 23, 2016, the disclosures of which are incorporated herein by reference in their entirety.

BACKGROUND OF THE INVENTION

The present invention relates to a method for joining joining elements to components, particularly for stud welding, bolting or gluing with steps including preparing a joining element which comprises a first joining surface, preparing a component which has a second joining surface, preparing said first and/or second joining surface, and carrying out the joining process, in which the joining element is joined to the component, wherein the preparatory step comprises a cleaning method.

The present invention also relates to a joining device for joining a joining element to a component, especially for carrying out the above-mentioned method, with a joining head, which comprises a retaining device for a joining element and by means of which the joining element can be moved along a joining axis in relation to a component, and with a cleaning device to carry out a cleaning process on a joining surface of the component and/or on a joining surface of the joining element.

Joining methods and joining devices of the above-mentioned kind are widely known, especially in the field of so-called stud welding or stud gluing.

In these methods, joining elements such as studs are joined to components such as plates in such a way that the studs protrude perpendicular to a surface of the component. Such joined arrangements can be used to attach clips made from plastics material, for example, to the stud. The clips may, for example, be used to fix pipes or cables in relation to the component, such as, for example, fuel pipes, brake pipes or electrical cables. The generic joining method is therefore used in particular in the field of bodywork manufacturing for motor vehicles.

In stud welding, an electrical current flow is established between the joining element and the component, the joining element being raised above the component so that an arc is generated between said components. The arc causes the opposite joining surfaces of the component and the joining element to melt. The joining element is then lowered onto the component so that the electrical joining current is short-circuited. The entire molten mass solidifies and the joining process is complete.

In stud gluing, an adhesive which can be activitate is generally applied to one joining surface of a joining element beforehand. Stud gluing then takes place by activating the adhesive. The joining element and the component are then pressed against one another and finally the adhesive is cured. This can be achieved by a variety of factors, such as by applying heat, for example.

The joining process itself is not the only factor responsible for the quality of such joints. The material properties and the surface quality of the component, and also the joining element in some cases, also play a not insignificant role in this process. This applies if the component and the joining element are manufactured from a steel material. Besides, this problem applies if the component and the joining element are each manufactured from an aluminum alloy.

Changes in the characteristic properties of the component are particularly noticeable in joints based on aluminum alloys. Such properties may include whether the aluminum alloy is a recycled material. In addition, there may also be problems with regard to irregular grain sizes on the upper layer, which may be up to 1 mm deep, and in particular when using extruded material.

Irregular grain sizes may lead to different conductivity values. As a result, this may affect the current flow through the arc.

Many components are also manufactured using casting processes. In such cases, the surface is coated with release agents, which may include waxes, oils, polysiloxanes, hydrocarbons, polymers, etc. If the coating or the coat comprising such release agents is unevenly distributed over the surface, it is particularly difficult to adapt the joining parameters appropriately. If coated with carbon, this can lead to pores or cavities in a welded joint, or in other words to a higher porosity of the welded joint overall, which may have a detrimental effect on its strength.

In addition, alloy components may also have an effect on weldability.

As a general rule, components with defined surface specifications are required, but practice suggests that these surface specifications, to which a joining process is then specifically adapted in relation to joining parameters, are not always observed satisfactorily.

In stud welding, the use of an arc cleaning ("clean flash") process before the actual stud welding process is already known in the art. In this case, an arc is created between the joining element and component with alternating polarity before the welding process, causing impurities to be ionized and detached from the component surface. The problem with this process is that such impurities may accumulate on the joining surface on the stud, as a result of which problems may still arise, even in this case, with regard to the consistency of the joints.

In the light of the above, one object of the invention is to provide an improved method for joining a joining element to a component and an improved joining device for this purpose.

BRIEF SUMMARY OF THE INVENTION

The above object is achieved on the one hand by a method for joining joining elements to components, particularly for stud welding or stud gluing, with steps including providing a joining element which comprises a first joining surface, providing a component which comprises a second joining surface, preparing said first and/or second joining surface, and carrying out the joining process, in which the joining element is joined to the component, wherein the preparatory step comprises at least one of the following cleaning methods for cleaning the joining surface: a TIG arc method, a plasma gas cleaning method and a snow jet method.

The object is also achieved by a joining device for joining a joining element to a component, especially for carrying out the method according to the invention, with a joining head, which comprises a retaining device for a joining element and by means of which the joining element can be moved along a joining axis in relation to a component, and with a cleaning device to carry out a cleaning process on a joining surface of the component and/or on a joining surface of the joining element, said cleaning device comprising a TIG arc cleaning device, a plasma gas cleaning device and a snow jet cleaning device.

The cleaning methods according to the invention each differ from the clean flash cleaning method mentioned initially, in which an arc with alternating polarity is created between the joining surfaces using stud welding equipment, which at least causes the joining surface of the component to be cleaned.

The cleaning methods according to the invention, which differ from such a clean flash method, allow only one of the joining surfaces or both joining surfaces, one after the other, to be cleaned in a targeted manner.

The cleaning step preferably entails cleaning the joining surface using a physical cleaning medium, which differs from an arc created between the joining element and the component.

In other words, the cleaning step entails a cleaning process which is carried out independently of the joining process.

The cleaning step is preferably carried out in one stage, in which a joining element is already in a retaining device of a joining head and is assigned to a specific position (joining position) on the component. This is particularly advantageous if a cleaning device for carrying out the cleaning process is arranged on the joining head.

Alternatively, it is possible to carry out consecutive cleaning processes at each of these joining positions on a component on which a plurality of joining elements, for example, are to be fixed, in some cases even before a joining element is placed in a retaining device of a joining head if applicable. The cleaning process or cleaning processes may thus be performed on one component or jointly, so that all joining elements can then be attached to the component, no further cleaning process being required between the joining processes.

As mentioned above, the cleaning process is preferably carried out using a cleaning medium.

The cleaning medium may be a gas, a liquid or a solid. The cleaning medium is preferably applied to the component by means of a separate cleaning device, which directs the cleaning medium onto a joining surface, particularly onto a joining position on the component. The cleaning device used to apply the cleaning medium is for example designed such that it is separate and independent from the technology used to carry out the joining process.

The joining method and the joining device according to the present invention can preferably be combined by a step in which at least one characteristic variable of the component and/or the joining element is recorded and subsequently evaluated. The evaluation may, in some cases, allow for the fact that it is necessary to carry out a preliminary cleaning process according to the invention if a joining position is evaluated negatively. In other cases, in which a joining position receives a good preliminary evaluation, it may not be necessary to carry out such a cleaning process before carrying out the joining process.

The characteristic variable in this case may relate to the material, the surface quality, surface processing, carbon coating on the surface, cleanliness, and may relate to release agents in the case of a cast workpiece, but may also include relative variables such as the component material in relation to the joining element material, for example.

According to an embodiment, only at least one characteristic variable of the component is recorded and only one joining surface of the component is cleaned, if this is necessary. All subsequent references to recording and evaluating a variable of a component and to cleaning a joining surface of the component should, however, relate equally to recording or evaluating a variable of the joining element and cleaning a joining surface of the joining element unless otherwise explicitly specified.

Such a characteristic variable is preferably recorded automatically and specifically preferably by means of an appropriate recording device. This recording device or these recording devices may include suitable sensors which either work on a purely passive basis or where the workpiece actively undergoes a physical process, in which the subsequent reaction to this process is recorded by sensors.

Such an active recording process may, for example, entail an electrical conductivity measurement using an eddy current measurement method, or even a surface coating measurement using fluorescence excitation, or contact resistance measurement.

In the case of fluorescence measurement, light in the visible range or in the UV range may be applied to the joining surface, and the resulting excited fluorescence radiation (usually in a different frequency range) is then recorded. Individual photons can be "counted" in particular, the number of recorded photons or light quanta usually being in correlation with the thickness or density of a coating on the joining surface of the component.

In the case of electrical conductivity measurements, an alternating magnetic field may, for example, be induced in the component surface. As the component is preferably a non-magnetic material such as an aluminum alloy, this gives rise to eddy currents in the component, which in turn generate a magnetic field. This reaction field can then be recorded. The magnitude and intensity of the reaction field may be an indicator of specific material properties, such as hardness, thermal conductivity, homogeneity or similar properties of such a component. In particular, the reaction field correlates to electrical conductivity.

In the case of contact resistance measurements, a contact is placed on the joining surface and a voltage between the contact and the component is increased and/or a force by means of which the tip of the contact is pressed onto the component is increased. The thickness and/or density of a coating on the surface can be deduced as a result of the alternating electrical resistance resulting from this action.

The object of the invention is thus achieved in its entirety.

According to a preferred embodiment of the invention, the plasma gas cleaning method entails generating a non-transmitted (or non-transferable) arc between a tungsten electrode and an anode surrounding the tungsten electrode, said arc generating plasma when using a plasma gas, said plasma being directed onto the joining surface. In this case a tungsten electrode is understood to mean an electrode manufactured from a metal with a very high melting point, or in other words, in particular an electrode made from a material such as tungsten, which does not melt when an arc is generated.

In this case, the arc is generated between the tungsten electrode and an anode made from an electrically conductive material surrounding the tungsten electrode. In other words, an electric arc is not generated between the tungsten electrode and the component or its joining surface in this step. As a result, this is a non-transmitted (or non-transferable) arc. The plasma or the "plasma arc" cannot be electrically conductive as a result of this measure and can therefore preferably not be deflected by magnetic means. Accordingly, the plasma arc can be focused satisfactorily and is preferably not deflected or only slightly deflected from a cleaning axis (joining axis) as a result.

The plasma or the plasma arc which is directed onto the joining surface causes any surface coatings on the joining surface to evaporate without these materials subsequently accumulating on the joining surface of the joining element.

Standard impurities such as oil films, grease, etc. can be removed particularly well.

In this process it is particularly preferable if the plasma gas is passed under pressure into an intermediate space between the tungsten electrode and the anode, the plasma being discharged from the intermediate space towards the joining surface.

The gas pressure also ensures that a coating of this kind on the joining surface is also eliminated from the surface as a result of the gas pressure, or in other words, an oil film can be driven outwards in the form of a ring.

According to another preferred embodiment, the anode is connected to a plasma gas nozzle at an end located downstream in the direction of the plasma gas discharge direction, said nozzle combining the plasma or plasma arc emerging from the intermediate space.

A very narrow plasma arc can be produced as a result, said arc preferably comprising a conical shape when it emerges from the plasma gas nozzle with a cone angle of <15°, particularly <10°.

The plasma emerging onto the joining surface, which is also referred to as the plasma arc, is therefore very directionally stable. Position deviations between a programmed position and an arc deflection due to blowing effects are therefore very minor. The plasma arc may also be stable if the distance between the plasma gas nozzle and the component fluctuates. Such a plasma arc can also continue to function in a stable manner even with low electric currents.

An inert gas or similar is preferably not generated around the plasma arc, as the joining surface is not melted by means of the plasma arc in the region of the joining surface, or in other words, the presence of oxygen or similar at the cleaning region is not generally a problem.

According to a preferred embodiment, a distance ranging from 2 mm to 25 mm is adjusted between the plasma gas nozzle and the joining surface during the cleaning step. The distance preferably ranges from 2 mm to 50 mm, or particularly from 3 mm to 10 mm.

It is also advantageous if the ratio between a nozzle diameter of the plasma gas nozzle and a distance adjusted between the plasma gas nozzle and the joining surface during the cleaning step ranges from 1:4 to 1:1.

In this case the nozzle diameter of the plasma gas nozzle is preferably the internal diameter of the plasma gas nozzle, or in other words the effective diameter through which the plasma emerges from the plasma gas nozzle.

In particular, this ratio may range from 1:3 to 1:1.5.

It is also advantageous if the anode and/or a plasma gas nozzle connected to the anode is cooled by means of a cooling device.

As a result, the plasma jet formed by the tungsten electrode and the anode can be produced such that it is thermally stable. The cooling device may preferably be water cooling.

It is also preferable if an electrical voltage ranging from 5 V to 400 V is applied between the tungsten electrode and the anode to generate the plasma. The electrical voltage may in particular range from 5 V to 300 V, particularly from 5 V to 100 V.

It is also preferable if an electric current ranging from 10 kA to 300 kA flows between the tungsten electrode and the anode to generate the plasma.

When generating the plasma to clean the joining surface, a stable arc can be produced with relatively low voltages and relatively high currents.

The diameter of the plasma gas nozzle preferably ranges from 1 mm to 10 mm.

In an embodiment, the joining method further comprises the step of generating an ignition tip on the joining surface.

In an embodiment, the plasma used in the cleaning process is also used to generate the ignition tip. Thus, the same plasma may be used for the cleaning and to provide an ignition tip. The ignition tip may be generated after or during the cleaning process. The same device can therefore clean the surface and generate an ignition tip.

In an embodiment the plasma is used to locally melt the joining surface and forms the ignition tip.

In an embodiment, the ignition tip comprises a circular cross-section. More specifically, the plasma (or plasma jet) creates a circular projection which projects from a general flat plane of the joining surface. This projection forms the ignition tip.

In an embodiment, the ignition tip is provided on the second joining surface.

In an embodiment, the joining element is joined to the component through arc welding, with drawn-arc ignition, and wherein the joining process comprises:

placing the first joining surface adjacent the ignition tip of the second joining surface and switching on an electric pilot current, lifting the joining element away from the component, flowing a welding current through the arc in such a manner that the first joining surface and second joining surface start to melt, lowering the joining element onto the component, wherein the melts of the first and second joining surfaces mix, switching off the welding current so that the entire melt solidifies to join the joining element and the component.

According to another preferred embodiment, it is advantageous if the snow jet method entails compressing a gas and expanding the compressed gas through a snow jet nozzle such as to create snow or ice crystals which are directed onto the joining surface.

The cleaning method using the snow jet method is preferably based on three effects. Firstly, a thermal effect, in which the joining surface or a coating on the joining surface is cooled suddenly on impact with the snow jet. The temperature of the snow jet may range from −20° C. to −150° C., particularly from −50° C. to −100° C.

The sudden cooling preferably leads to embrittlement and crack formation in the coating on the joining surface. The component and the impurities have different thermal expansion coefficients which favor this mechanism.

The second cleaning effect is a mechanical effect, in which dirt particles are detached and/or carried away by the aerodynamic or kinetic force of the snow jet.

A third cleaning effect is a so-called sublimation effect. This effect supports the thermal effect and the mechanical effect by a pressure wave due to the increased volume resulting as the gas changes from the solid to the gaseous state.

The gas used to produce the snow jet is preferably $CO_2$.

In this case, it is particularly preferable if the snow or ice crystals are accelerated by compressed air and directed onto the joining surface.

In this case, the compressed air may preferably be provided at a pressure ranging from 0 to 16 bar, particularly from 0.5 bar to 15 bar, especially from 5 bar to 12 bar.

According to another preferred embodiment, a distance ranging from 3 mm to 150 mm, particularly from 40 mm to 120 mm, is established between the snow jet nozzle and the joining surface during the cleaning step.

According to another preferred embodiment, the snow jet nozzle is oriented at an angle ranging from 30° to 85° in relation to the joining surface during the cleaning step.

It is possible to promote the detachment of impurities by inclining the snow jet with respect to the joining surface. In particular, it is easier to remove impurities with high viscosity by adjusting the jet angle in a range between 30° and 85°.

In this variation, it is particularly preferable if the snow jet is applied in a tumbling manner with respect to a longitudinal axis (90° axis).

According to another preferred embodiment, a ratio between a diameter of the snow jet nozzle and a distance between the snow jet nozzle and the joining surface ranges from 1:2 to 1:50, particularly from 1:5 to 1:20 and especially from 1:8 to 1:15.

According to another preferred embodiment, compressed air is blown onto the joining surface after the snow jet cleaning step to reduce condensation on the joining surface.

The compressed air is preferably at room temperature, but in any event preferably warmer than 0° C.

As a result, the component can be warmed up again after the cleaning step to reduce or prevent condensation.

In other words, after switching off the gas to generate the snow jet, compressed air is preferably blown through afterwards.

According to another preferred embodiment, the TIG arc method entails generating an arc between a tungsten electrode and the joining surface.

In other words, a TIG arc is not created between the joining element and the component, but between a separate tungsten electrode provided for this purpose and the joining surface of the component.

A good cleaning action can also be achieved by this means. The fact that a TIG arc of this kind is not potential-free in some cases makes it easier to deflect said TIG arc.

While cleaning using a TIG arc normally takes a few seconds, cycle times of less than 3 seconds (<3 s), particularly less or equal 2 seconds (≤2 s), can be achieved with the plasma gas cleaning method and with the snow jet method.

It is assumed that the above-mentioned features and the features still to be explained below can not only be used in the respective specified combination, but also in other combinations or in isolation, without deviating from the scope of the present invention.

BRIEF DESCRIPTION OF THE DRAWINGS

Embodiments of the invention are shown in the drawings and explained in greater detail in the following description. These drawings are as follows.

DETAILED DESCRIPTION OF THE PREFERRED EMBODIMENTS

Figure 1:
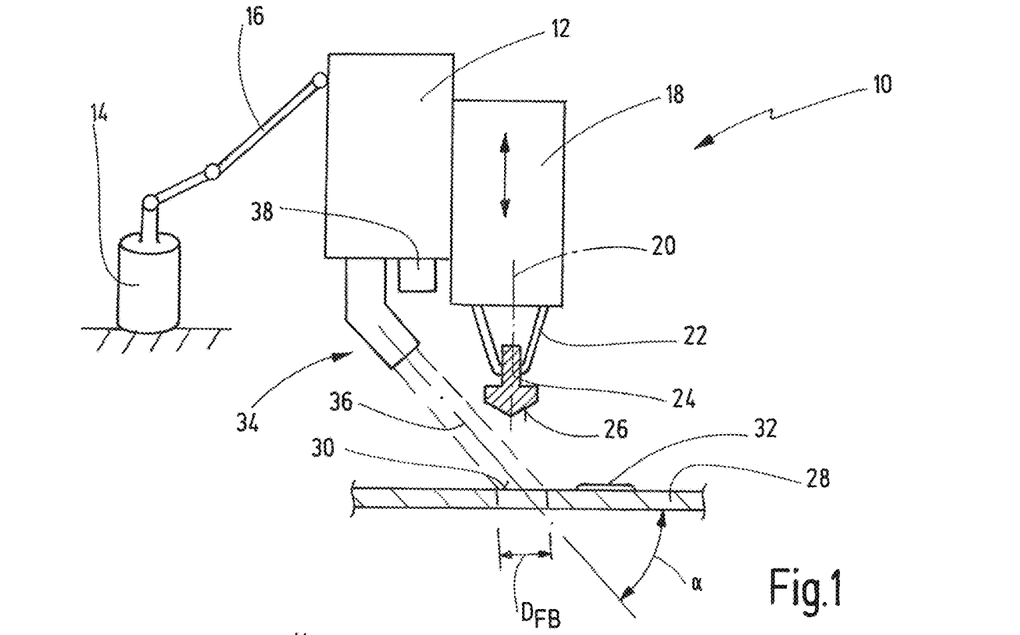
FIG. 1 is a schematic representation of a joining device according to an embodiment of the invention.

FIG. 1 is a schematic representation of a joining device for joining joining elements to components, generally referred to as 10.

The joining device 10 comprises a joining head 12, which can be moved freely in the space by means of a robot 14, said joining head 12 preferably being mounted on one arm 16 of the robot 14 in this case.

A carriage 18 can preferably be moved along a joining axis 20 on the joining head 12. The maximum stroke of the carriage 18 is preferably larger than a maximum joining stroke.

A retaining device 22 to retain a joining element 24 is arranged on the carriage 18. The joining element 24 may, for example, be designed as a stud, with a shaft portion which is not shown in greater detail, and a flange portion which is not shown in greater detail, a first joining surface 26 being formed on one side of the flange portion facing away from the shaft portion. The joining element 24 is preferably made from aluminum or aluminum alloy.

The joining element 24 can be joined to a component 28 such as a plate by means of the joining device 10, the component 28 preferably also being made from aluminum or an aluminum alloy.

A second joining surface 30 is formed on the component 28, said surface having a diameter $D_{FB}$, which approximately corresponds to the diameter of the flange portion of the joining element 24.

A coating 32 may be formed on the joining surface 30, said coating being formed of release agents or waxes, oils, polysiloxanes, hydrocarbons, polymers, etc.

The joining device 10 is in particular designed as a stud welding device, but may also be in the form of a stud bonding/stud gluing device.

The joining device 10 comprises a cleaning device 34, by means of which the second joining surface 30 can be cleaned before carrying out the joining process. The cleaning device 34 is preferably designed to direct a cleaning medium onto the second joining surface 30, and specifically along a longitudinal axis 36, which is oriented at an angle α with respect to the second joining surface 30. The angle α may, for example, range from 30° to 90°, and particularly from 30° to 85°.

In an embodiment (not shown in the figures), the first joining surface can be cleaned before carrying out the joining process by the joining device 10. In another embodiment, the first and second joining surfaces might be cleaned simultaneously and/or both surfaces might be cleaned by the cleaning device 34.

As illustrated, the cleaning device 34 is attached to the joining head 12, but may also be designed to be independent from the joining head 12.

Furthermore, the joining device 10 may comprise a recording device 38, which is able to record the status of the second joining surface 30 and/or a surface coating on the second joining surface 30. In particular, the recording device 38 is designed to record a characteristic variable of the component 28.

In this case the cleaning device 38 is attached to the joining head 12, but may also be designed to be independent from said joining head 12.

In order to provide high quality joints, and especially to provide consistent joints, it is preferable for each joining surface 30 to be first processed by the recording device 38 before carrying out a joining process on said surface, after which the characteristic variable thus recorded is evaluated. A decision can be made on the basis of this variable whether a joining process can be performed immediately afterwards, or whether it is desirable or necessary to perform a cleaning process using the cleaning device 34 beforehand.

Figures 2, 3:
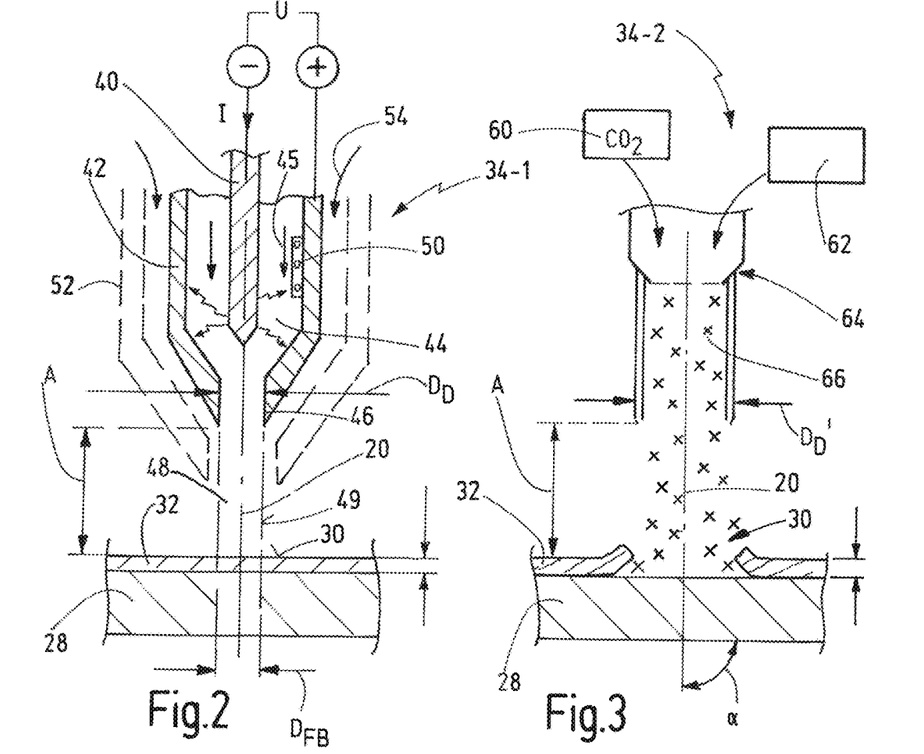
FIG. 2 is a schematic representation of a plasma gas cleaning device.
FIG. 3 is a schematic representation of a snow jet cleaning device.

FIG. 2 shows a cleaning device 34-1 in the form of a plasma gas cleaning device.

The plasma gas cleaning device 34-1 comprises an elongated tungsten electrode 40, which preferably extends coaxially in relation to a joining axis 20 or cleaning axis 20.

The cleaning device 34-1 also comprises an anode sleeve 42, an annular intermediate space 44 being formed between the tungsten electrode 40 and the anode sleeve 42.

A plasma gas 45 is admitted to the intermediate space 44. An arc voltage U is applied between the tungsten electrode 40 and the anode sleeve 42, causing a corresponding current I to flow.

Plasma 49 is generated between the tungsten electrode 40 and the anode sleeve 42 from the plasma gas 45 as a result of this arc voltage U and the current I, said plasma emerging from a plasma gas nozzle 46 arranged at one downstream end of the anode sleeve 42.

As a result, a kind of plasma arc (or plasma jet) is generated from the plasma gas nozzle 46 towards the second joining surface 30, this arc being a non-transmitted arc (or non-transferable arc), and preferably not undergoing any magnetic deflection due to ground effects.

The space A between the plasma gas nozzle 46 and the second joining surface 30 may, for example, range from 2 mm to 25 mm. The internal diameter $D_D$ of the plasma gas nozzle may, for example, range from 2 mm to 15 mm.

FIG. 2 also shows that the arrangement of the tungsten electrode 40 and the anode sleeve 42 may be cooled by a cooling device 50, for example by water cooling. As a result, this arrangement can be made more thermally stable.

As a general rule, it is not necessary to supply an inert gas around the plasma arc 48, as is known from TIG welding, for example. If this is still necessary for specific reasons, an inert gas sleeve 52 may be arranged around the outside of the anode sleeve 42 such that an inert gas 54 can be supplied between the inert gas sleeve 52 and the anode sleeve 42.

FIG. 3 shows a snow jet cleaning device 34-2 in which a gas 60 such as $CO_2$ and compressed air are passed into a snow jet nozzle 64 from a compressed air generator 62. In this process the gas 60 is first compressed and then expanded in the snow jet nozzle such as to produce snow or ice crystals 66 in the snow jet nozzle 64.

The internal diameter $D_D'$ of the snow jet nozzle may, for example, range from 1 mm to 5 mm.

The snow crystals 66 carried by the compressed air flow impact on and break up a coating 32, as illustrated schematically in FIG. 3.

In the snow jet cleaning device 34-2, it may be preferable if a joining or cleaning axis 20 is oriented at an angle a in relation to the joining surface 30, said angle ranging from 30° to 85°.

Figure 4:
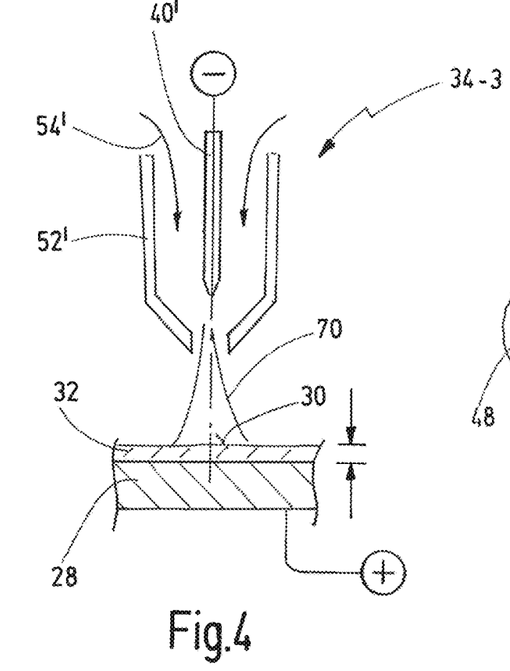
FIG. 4 is a schematic representation of a TIG arc cleaning device.

FIG. 4 shows a TIG arc cleaning device 34-3. In this case, an arc voltage is applied between a tungsten electrode 40' and the component 28 such that a TIG arc 17 is created between the tungsten electrode 40' and the component 28 in the region of the joining surface 30. If applicable, an inert gas sleeve 52' may be provided around the tungsten electrode 40' such that the TIG arc 70 can be surrounded by an inert gas 54.

Figure 5:
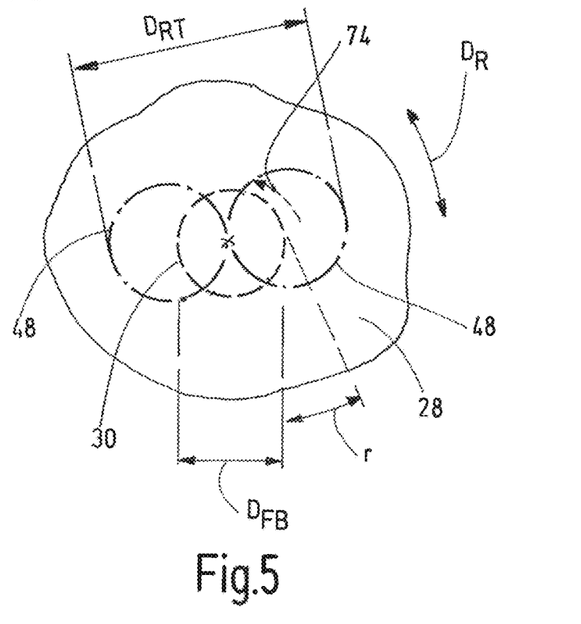
FIG. 5 is a schematic plan view of a joining surface.

FIG. 5 shows a plan view of a joining surface 30 of a component 28, said joining surface having a diameter $D_{FB}$.

A radius of the joining surface 30 is shown as r.

Various positions on a plasma arc 48 (or a snow jet) directed onto the joining surface 30 are shown as 48.

It is evident that the diameter DR of this plasma arc 48 (or the snow jet) may be greater than or equal to the diameter $D_{FB}$, but may also be smaller. An effective overall cleaning surface can be achieved by moving the plasma arc 48 (or the snow jet) in relation to the second joining surface 30, for example on a circular path 74. It is also possible to position the plasma arc 48 (or the snow jet) at an angle in relation to the joining surface 30 such as to produce an overall tumbling motion.

Figure 6:
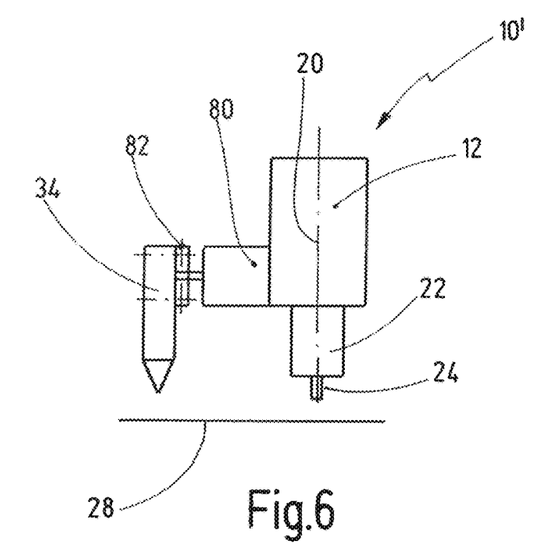
FIG. 6 is a schematic representation of another embodiment of a joining device according to the invention from the side.
Figure 7:
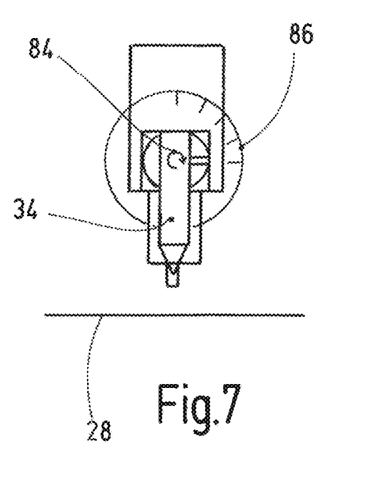
FIG. 7 shows the joining device in FIG. 6 from the front.

FIGS. 6 and 7 show another embodiment of a joining device 10' which generally corresponds to the joining device 10 shown in FIG. 1 with regard to its structure and mode of operation. The same components are therefore identified by the same reference numerals.

The joining device 10' comprises a motor 80, which is fixed to the joining head 12, a cleaning device 34 being able to rotate around an axis of rotation, which is oriented transversely with respect to the joining axis 20. In this case the motor 80 is connected to the cleaning device 34 via an interface 82. The direction of rotation 84 around the axis of rotation is shown in FIG. 7. A displacement measurement device 86 is preferably assigned to the cleaning device 34 and used to record the angle of rotation.

The angle a at which a cleaning medium is directed onto a joining surface 30 of the component 28 can be adjusted by means of the motor 80 as a result.

FIG. 8a to FIG. 8e show different steps of a joining method according to the invention. The cleaning device 34 is for example a cleaning device 34-1 in the form of a plasma gas cleaning device. Eventually the cleaning device 34 is a TIG arc cleaning device 34-3.

Figure 8A:
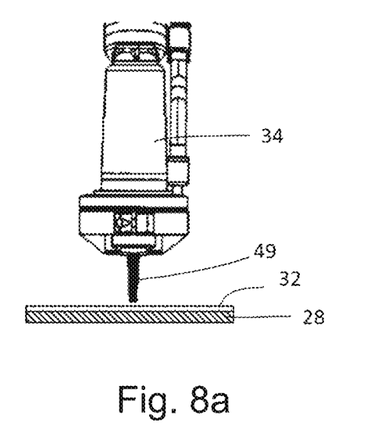
FIG. 8A to 8E show different steps of a joining method with a plasma cleaning method and the generation of an ignition point on the joining surface.
Figure 8B:
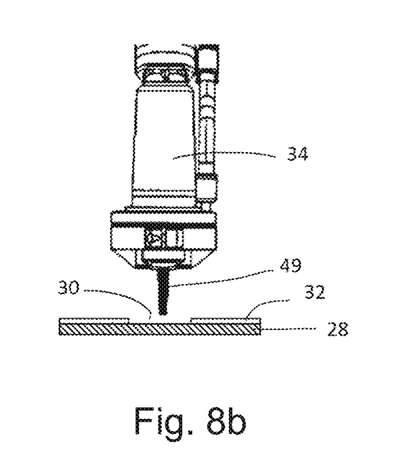

As illustrated in FIG. 8a and FIG. 8b, the plasma 49 or a plasma jet is used to clean the joining surface 26, 30, and in particular the second joining surface 30 as described above. The plasma 49 or plasma jet will first clean the joining surface (in particular the second joining surface 30). Any lubricant or contamination provided on the joining surface are removed through the plasma 49 or plasma jet. The plasma jet is in particular generated by a power source. Through the thermal effect of the plasma, the coating 32 (which can be as previously mentioned oils, polymers, contaminations . . . ) is vaporized, burnt and/or removed.

Figure 8C:
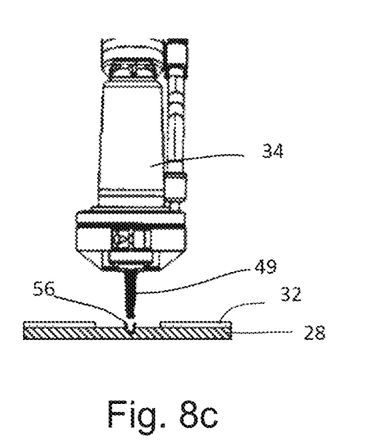

The plasma 49 or plasma jet is further applied in order to create a local melting of the joining surface, as shown in FIG. 8c. The parameters used to generate the plasma during the cleaning step might be modified to provide the melting area. The pressure applied by the plasma on the melting area generates a projection or ignition tip 56. The projection or ignition tip 56 has a circular shape or a circular cross section. For example, the projection or ignition tip 56 has a crater-like shape.

The ignition tip 56 enables a better welding of the joining element on the component, as already known from the prior art. The generation of the joining tip 56 on the component 28 and not on the joining element 24, allows to avoid a pre-forming of the joining element 24. Thus, the shape of the joining element 24 might be randomly chosen and its end face (or joining surface) may not need to be prepared.

Figure 8D:
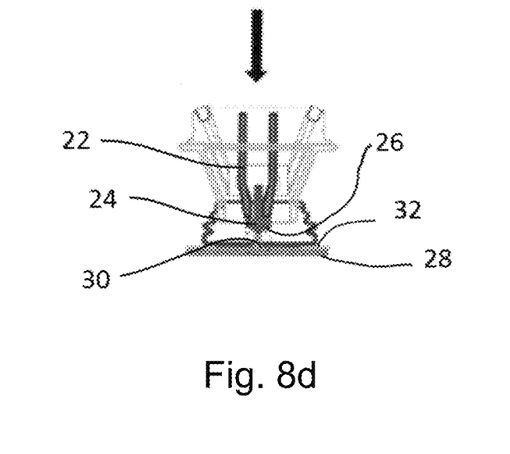
Figure 8E:
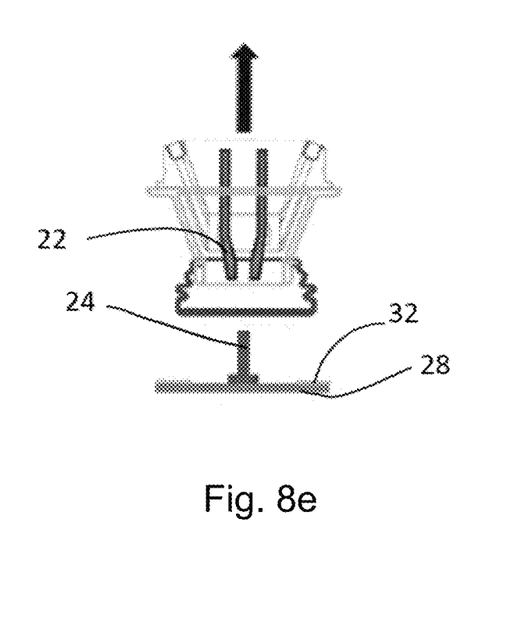

More particularly, after forming the ignition tip 56, the joining element 24 may be joined to the component 28 through arc welding, with drawn-arc ignition. In a first step, the first joining surface 26 is placed adjacent the ignition tip of the second joining surface 30. An electric pilot current is switched on. The joining element 24 is then lifted away from the component 28 with the retaining device 22. The welding current flows through the arc in such a manner that the first joining surface 26 and second joining surface 30 start to melt. More particularly, the second joining surface starts to melts from the ignition tip, which allows a better repartition of the melting. The ignition tip 56 allows the arc to remain in a precise location.

The joining element 24 is then lowered onto the component 28, and the melts of the first and second joining surfaces 26, 30 mix. The welding current is switched off and the entire melt solidifies to join the joining element 24 and the component 28, as visible in FIG. 8e. The retaining device 22 can then be moved away from the assembly, for example by following the direction of the arrow shown in FIG. 8e.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A joining method for joining by welding joining elements to a component, the method comprising the following steps:
   providing a joining element, which includes a first joining surface, and providing a component, which includes a second joining surface;
   preparing one of the first or second joining surface, using a plasma gas cleaning method including the cleaning steps of:
      generating a non-transferable arc between a tungsten electrode and an anode surrounding the tungsten electrode;
      generating with the non-transferable arc a plasma from a plasma gas;
      directing the plasma onto at least one of the first joining surface or the second joining surface;
      generating an ignition tip on the one of the first joining surface or the second joining surface, wherein the plasma used in the cleaning process is also used to generate the ignition tip, the plasma locally melting the one of the first joining surface or the second joining surface and forming the ignition tip; and
   joining the joining element to the component by welding.

2. The joining method according to claim 1, wherein the plasma gas is conducted under pressure through an intermediate space between the tungsten electrode and the anode, and the plasma is discharged from the intermediate space towards the one of the first joining surface or the second joining surface.

3. The joining method according to claim 2, wherein the anode is connected to a plasma gas nozzle located downstream in the direction of a plasma gas discharge direction, and the nozzle focuses the plasma emerging from the intermediate space.

4. The joining method according to claim 3, wherein the cleaning steps further include at least one of the steps of:
   adjusting a distance between the plasma gas nozzle and the joining surface in a range from 2 mm to 25 mm;
   adjusting a ratio between a nozzle diameter ($D_D$) of the plasma gas nozzle and a distance (A) between the plasma gas nozzle and the one of the first joining surface or the second joining surface in a range from 1:4 to 1:1; and
   cooling the anode or the plasma gas nozzle with a cooling device.

5. The joining method according to claim 2, wherein the cleaning step of generating a plasma further includes the step of applying between the tungsten electrode and the anode at least one of:
   an electric voltage (U) ranging from 5 Volts to 400 Volts; and
   an electric current (I) ranging from 10 kilo-amperes to 300 kilo-amperes.

6. The joining method according to claim 1, wherein the ignition tip is formed on the second joining surface.

7. The joining method according to claim 6, wherein the joining step whereby the joining element is joined to the component includes an arc welding process with drawn-arc ignition; the arc welding process including the steps of:
   placing the first joining surface adjacent the ignition tip of the second joining surface and switching on an electric pilot current;
   lifting the joining element away from the component;
   flowing a welding current through the arc in such a manner that the first joining surface and second joining surface start to melt;
   lowering the joining element onto the component, wherein the melts of the first and second joining surfaces mix; and
   switching off the welding current so that the entire melt solidifies to join the joining element and the component.

* * * * *